(12) United States Patent
Faccin

(10) Patent No.: US 9,326,220 B2
(45) Date of Patent: Apr. 26, 2016

(54) MECHANISM TO DISCOVER 802.21 REMOTE EVENTS AND INFORMATION SERVICES

(75) Inventor: Stefano M. Faccin, Dallas, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 1614 days.

(21) Appl. No.: 11/431,120

(22) Filed: May 8, 2006

(65) Prior Publication Data

US 2006/0274699 A1    Dec. 7, 2006

Related U.S. Application Data

(60) Provisional application No. 60/679,386, filed on May 6, 2005.

(51) Int. Cl.
*G06F 15/173*    (2006.01)
*H04W 48/08*    (2009.01)
(Continued)

(52) U.S. Cl.
CPC .............. *H04W 48/08* (2013.01); *H04W 48/16* (2013.01); *H04W 36/005* (2013.01); *H04W 84/12* (2013.01)

(58) Field of Classification Search
CPC ... H04W 48/08; H04W 48/16; H04W 36/005; H04W 84/12
USPC ......... 709/220, 201, 219, 217, 218, 249, 238, 709/232, 224, 226, 203, 245, 231; 707/501, 707/505, 506, 530, 513; 715/215, 735, 736, 715/740; 370/230, 231, 232, 352, 389, 229, 370/254, 360; 705/5, 6, 1, 28, 26, 27, 56, 705/35, 37, 44, 10, 14, 30, 7
See application file for complete search history.

(56) References Cited

U.S. PATENT DOCUMENTS

2004/0137903 A1*    7/2004  Park ............................. 455/436

2005/0004916 A1*    1/2005  Miller et al. .................... 707/10
(Continued)

FOREIGN PATENT DOCUMENTS

| WO | 2006088327 A1 | | 8/2006 | |
|---|---|---|---|---|
| WO | WO 2006/088327 | * | 8/2006 | ............... H04Q 7/20 |
| WO | 2006088318 A1 | | 8/2009 | |

OTHER PUBLICATIONS

Michael Hoghooghi et al., Media Independent Handover Functions and Services Specification, Mar. 14, 2004, p. 1-79.*

(Continued)

*Primary Examiner* — John MacIlwinen
(74) *Attorney, Agent, or Firm* — Squire Patton Boggs (US) LLP

(57) ABSTRACT

A mechanism or technique is provided for a MIHF to discover the events and the type of information (for the information service) available in another MIHF to be able to subscribe to such events. The mechanism allows one instance of the MIHF to publish (push model) the event it supports and therefore capable to report to another instance of the MIHF (e.g. the first being in the terminal and the second one in the network). Also, the mechanism allows one instance of the MIHF to request (pull model) whether a specific event is supported by another instance of the MIHF (e.g. the first being in the network and the second one in the terminal), or to request the whole list of events supported. In particular, the mechanism includes a method for one media independent handoff function (MIHF) to discover events or a type of information available in another MIHF, wherein the method includes allowing the one MIHF to request either whether a specific event, list of events, type of information or some combination thereof is being supported by another MIHF. The method includes allowing the one MIHF to be able to subscribe to the specific event or to receive the list of events or type of information.

35 Claims, 3 Drawing Sheets

(51) Int. Cl.
*H04W 48/16* (2009.01)
*H04W 36/00* (2009.01)
*H04W 84/12* (2009.01)

(56) References Cited

U.S. PATENT DOCUMENTS

| | | | |
|---|---|---|---|
| 2005/0249161 A1* | 11/2005 | Carlton | 370/331 |
| 2006/0092864 A1* | 5/2006 | Gupta et al. | 370/278 |
| 2006/0099948 A1* | 5/2006 | Hoghooghi et al. | 455/436 |
| 2006/0140150 A1* | 6/2006 | Olvera-Hernandez et al. | 370/331 |
| 2006/0153235 A1* | 7/2006 | Kiernan et al. | 370/469 |

OTHER PUBLICATIONS

"A Generalized Model for Link Layer Triggers," Vivek G Gupta, et al., Jan. 3, 2004; p. 2—li.1, p. 3 li 14; abstract.
"802.21, L2 Triggers A Strawman Proposal," David Johnston, Mar. 2004;.
Requirements for a Media Independent Handover Information Service draft-faccin-mih-infoserv-00.txt Internet-Draft.; Jun. 28, 2005; part 5.1, 5.2.
"IEEE P802.21 Media Independent Handover Service Draft Technical Requirements," Sep. 21, 2004, Vivek Gupta, IEEE P802.21 document 21-04-0087-12-0000.
3GPP TS 32.602: "Telecommunication management; Configuration Management (CM); Basic CM Integration Reference Point (IRP): Information Service (SS)".
3GPP TS 32.612: "Telecommunication management; Configuration Management (CM); Bulk CM Integration Reference Point (IRP): Information Service (IS)".
Faccin, S. and Williams, M., "Nokia MIH Proposal," Jan. 10, 2004, Monterey, CA; IEEE 802.21 Media Independent Handover, DCN 21-04-0169-02-0000 (49 pages).
Decision of Final Rejection corresponding to Japanese Patent Application No. 2008-509530 dated Jan. 17, 2012 and English translation thereof.
Communication dated Mar. 8, 2013 for corresponding EP Patent Application No. 06 744 655.9-1505.
Search Report dated Mar. 1, 2013 for corresponding EP Patent Application No. 06 744 655.9-1505.
Freescale Semiconductor et al., "Optimal Beacon & Architecture for MIH", IEEE 802.21 Working Group, No. DCN: IEEE 802.21-04-0164-2-0021, Mar. 4, 2005, XP002587905, slides 1-33.
Rejection Decision dated Aug. 29, 2012 in corresponding Chinese Patent Application No. 200680022056.0 and English summary thereof.
Indian Examination Report for corresponding Indian Patent Appin. No. 9389/DELNP/2007, dated Sep. 3, 2015.

* cited by examiner

MECHANISM TO DISCOVER 802.21 REMOTE EVENTS AND INFORMATION SERVICES

CROSS REFERENCE TO RELATED APPLICATIONS

This application claims benefit to U.S. provisional patent application Ser. No. 60/679,386, filed 6 May 2005, which is hereby incorporated by reference in its entirety.

BACKGROUND OF THE INVENTION

1. Field of Invention

The present invention relates to IEEE 802.21 Media Independent Handoff (MIH), and its instantiation in a IEEE 802.11 Wireless Local Area Network (WLAN), a IEEE 802.16 Broadband Wireless Access Network (BWA) and over L3 Internet Protocol (IP); and more particularly, relates to a mechanism or technique for one media independent handoff function (MIHF) to discover events or a type of information available in another MIHF in relation to the same.

2. Problem in the Art

FIG. 1 shows, by way of example, typical parts of an IEEE 802.11 WLAN system, which is known in the art and provides for communications between communications equipment such as mobile and secondary devices including personal digital assistants (PDAs), laptops and printers, etc. The WLAN system may be connected to a wire LAN system that allows wireless devices to access information and files on a file server or other suitable device or connecting to the Internet. The devices can communicate directly with each other in the absence of a base station in a so-called "ad-hoc" network, or they can communicate through a base station, called an access point (AP) in IEEE 802.11 terminology, with distributed services through the AP using local distributed services set (DSS) or wide area extended services (ESS), as shown. In a WLAN system, end user access devices are known as stations (STAs), which are transceivers (transmitters/receivers) that convert radio signals into digital signals that can be routed to and from communications device and connect the communications equipment to access points (APs) that receive and distribute data packets to other devices and/or networks. The STAs may take various forms ranging from wireless network interface card (NIC) adapters coupled to devices to integrated radio modules that are part of the devices, as well as an external adapter (USB), a PCMCIA card or a USB Dongle (self contained), which are all known in the art.

FIGS. 2a and 2b show diagrams of the Universal Mobile Telecommunications System (UMTS) packet network architecture, which is also known in the art. In FIG. 2a, the UMTS packet network architecture includes the major architectural elements of user equipment (UE), UMTS Terrestrial Radio Access Network (UTRAN), and core network (CN). The UE is interfaced to the UTRAN over a radio (Uu) interface, while the UTRAN interfaces to the core network (CN) over a (wired) Iu interface. FIG. 2b shows some further details of the architecture, particularly the UTRAN, which includes multiple Radio Network Subsystems (RNSs), each of which contains at least one Radio Network Controller (RNC).

The interworking of the WLAN (IEEE 802.11) shown in FIG. 1 with other technologies (e.g. 3GPP, 3GPP2 or 802.16 (BWA)) such as that shown in FIGS. 2a and 2b is being defined at present, for example, in protocol specifications for 3GPP and 3GPP2. In IEEE protocol specification, such activities are carried out in IEEE 802.11 TGu and in IEEE 802.21 (the latter specification focusing specifically on the handoff of a device).

In the IEEE 802.21 Protocol Specification, a set of events is defined, to define which triggers the MIHF can deliver to the logical functions that subscribe to such events. Specifically, in IEEE 802.21 one logical functionality (e.g. L3 mobility protocol, applications, connection manager, handoff controller) can subscribe with the MIHF to receive event notifications (triggers) related to certain events (e.g. a link layer is up, signal quality is below a certain threshold, etc.) The subscribing logical entity can be local, thus capable of performing local event subscription (within a specific entity, e.g. the MIH Function—MIHF—in the terminal), or remote, thus capable of performing remote event subscription (between e.g. the MIHF in the terminal and the MIHF in the network) will be specified in document [1] below).

For a remote MIHF to be able to subscribe to events in another entity (e.g. specifically for the MIHF in the network to be able to subscribe to events in the terminal through the MIHF in the terminal), the MIHF in the network must know which events are available in the terminal. In fact, it is expected that not all events supported by 802.21 will be meaningful and available for all terminal, depending on the access technology, e.g. 802.11 (WLAN), 802.16 (WBA), 3GPP, 3GPP2, etc.

Similarly, one entity can request information from a remote entity through the 802.21 MIH Information Service. However, how does one MIHF know what information is available and what is not from another MIHF?

The reader is referred to the following documents, which are hereby incorporated by reference in their entirety herein:

[1] IEEE 802.21 document 21-04-0087-12-0000, "IEEE P802.21 Media Independent Handover Service Draft Technical Requirements";

[2] 3GPP TS 32.602: "Telecommunication management; Configuration Management (CM); Basic CM Integration Reference Point (IRP): Information Service (SS)"; and

[3] 3GPP TS 32.612: "Telecommunication management; Configuration Management (CM); Bulk CM Integration Reference Point (IRP): Information Service (IS)".

SUMMARY OF THE INVENTION

The present invention provides a mechanism or technique for a MIHF to discover the events and the type of information (for the information service) available in another MIHF to be able to subscribe to such events. In particular, the mechanism allows one instance of the MIHF to publish (push model) the event it supports and therefore capable to report to another instance of the MIHF (e.g. the first being in the terminal and the second one in the network). Also, the mechanism allows one instance of the MIHF to request (pull model) whether a specific event is supported by another instance of the MIHF (e.g. the first being in the network and the second one in the terminal), or to request the whole list of events supported.

In particular, the present invention provides a method for one media independent handoff function (MIHF) to discover events or a type of information available in another MIHF, wherein the method includes allowing the one MIHF to request either whether a specific event, list of events, type of information or some combination thereof is being supported by another MIHF.

The method includes allowing the one MIHF to be able to subscribe to the specific event or to receive the list of events or type of information.

In one embodiment, the one MIHF may be in a terminal while the other MIHF is in a network.

In operation, the one MIHF provides a signal containing an event descriptor container (EDC), an information descriptor container (IDC), or some combination thereof.

The event descriptor container (EDC) may include a combination of an EDC descriptor (EDCD) and a set of event descriptors (ED). The EDCD contains information about whether it is being used in a query related to supported events or in a response to a query; in a message to publish the supported events; in a request/reply to subscribe to events; or some combination thereof. Each ED contains an event code to identify each event, event support information about whether an event is supported or not, event registration information about whether registration for this event was successful or not, an event subcode to describe features of events, or some combination thereof.

The IDC may include a combination of a set of information descriptors (ID), where each ID contains an information code containing information to uniquely identify such an information type about events, and where each ID contains an ID length indicating lengths of fields therein.

The method according to the present invention may include optional mechanisms to do one or more of the following:

to publish events supported by an MIHF by sending a list-event message from the one MIHF to the other MIHF containing an EDC populated with one ED for each event supported;

to explicitly request which events are supported by a given MIHF by sending a list-event request containing an empty EDC to request a whole list of events supported by a given MIHF;

to register to events and implicitly requesting which events are supported by a given MIHF by sending a registration message containing an empty EDC to request registration to a whole list of events supported by the given MIHF, or a populated EDC to request registration to specific events supported by a given MIHF;

to publish information supported by an IS by an MIHF by sending a list-information message containing an IDC populated with one ID for each information being supported; and/or to request which information are supported by a given MIHF by sending a list-information-request containing an empty IDC to request a whole list of information supported by the given MIHF, or a populated IDC to request if one information or a set of information is supported.

The scope of the invention is also intended to include a network having one or more network nodes for one media independent handoff function (MIHF) to discover events or a type of information available in another MIHF, wherein the network node is configured to allow the one MIHF to request either whether a specific event, list of events, type of information or some combination thereof is being supported by another MIHF.

Finally, the present invention is also intended to include a method having the one or more of the steps described herein performed in a computer program running on one or more processors or other suitable processing devices in one or more network nodes in such networks or systems, as well as a computer program product for one or more such network nodes for providing such functionality according to the present invention.

BRIEF DESCRIPTION OF THE DRAWING

The drawing includes the following Figures, which are not necessarily drawn to scale.

DETAILED DESCRIPTION OF THE INVENTION

Figure 1:
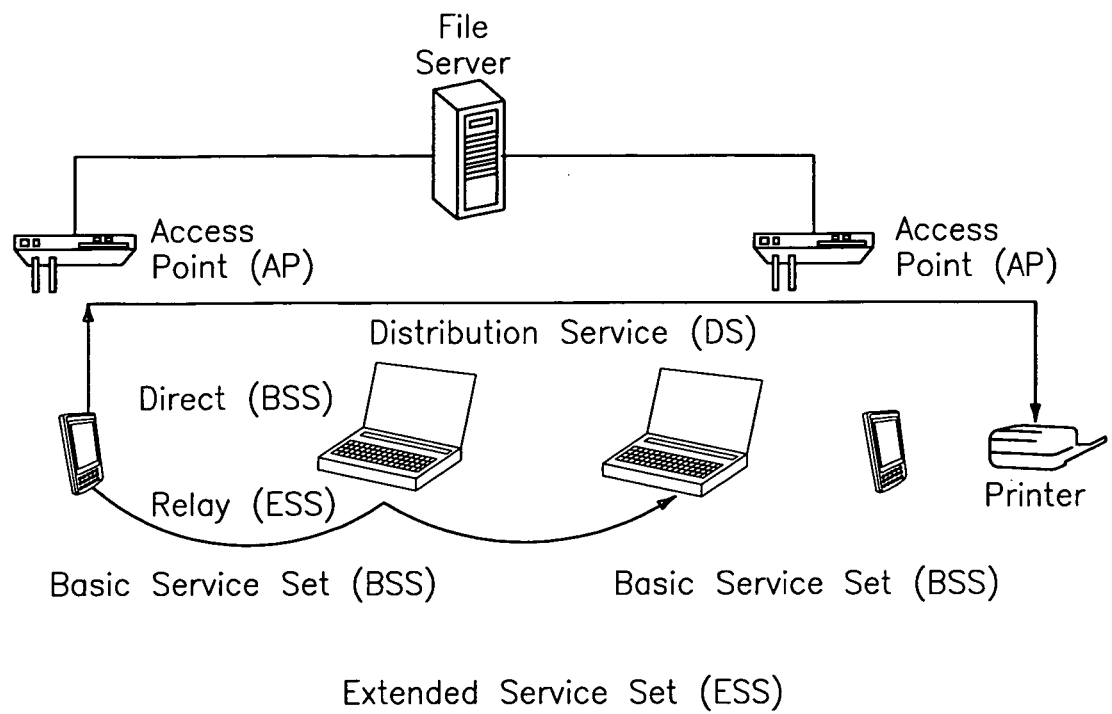
FIG. 1 shows typical parts of an IEEE 802.11 WLAN system, which is known in the art.
Figure 2A:
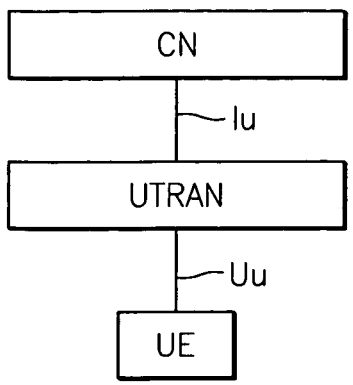
FIGS. 2a and 2b show diagrams of the Universal Mobile Telecommunications System (UMTS) packet network architecture, which is also known in the art.
Figure 2B:
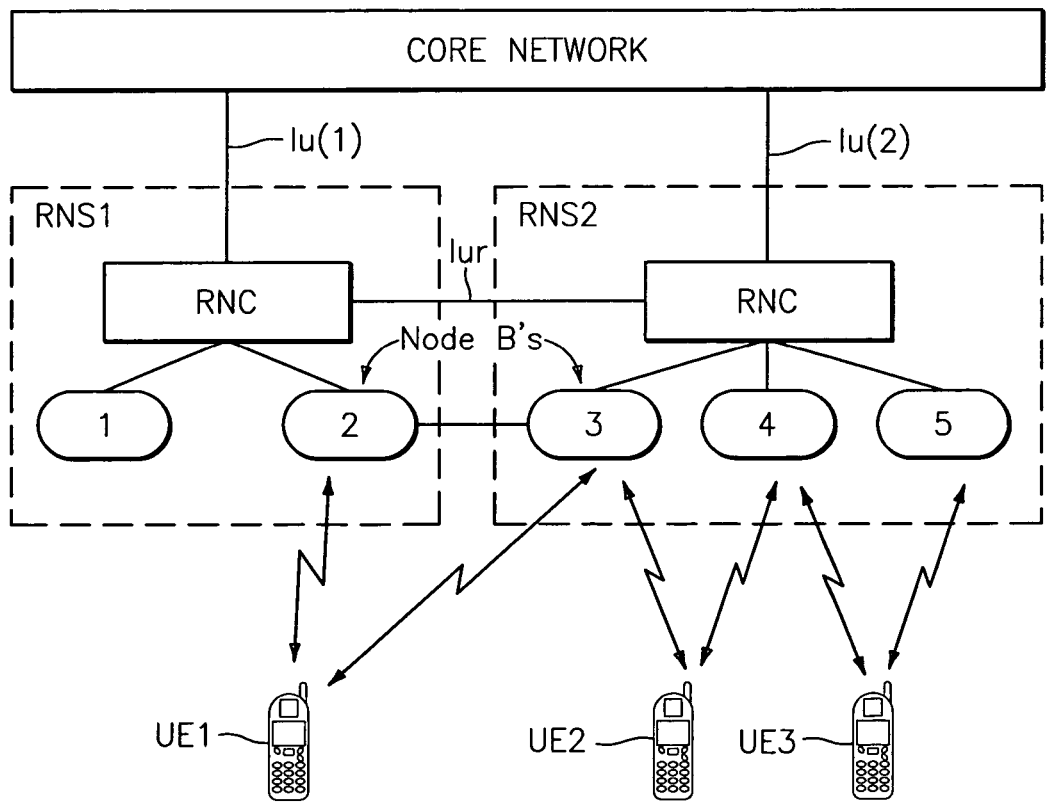

The implementation of the present invention is based on the following aspects (note that these are example of embodiments, other data structures with similar functionality can be used):

Event Descriptor Container

By way of example, an Event Descriptor Container (EDC) may be created as a combination of:
1) An EDC descriptor EDCD, where:
   the EDCD length is 3 or more bits (for extensibility for future usage):
      EDCD="0 . . . 000" indicates that the EDC is used in a query related to supported events or in a response to a query,
      EDCD="0 . . . 001" indicates that the EDC is used in a message to publish supported events, and
      EDCD="0 . . . 010" indicates that the EDC is used in a request/reply to subscribe to events.
2) A set of Event Descriptors (ED), where:
   Each ED contains:
      an Event Code (mandatory field, constant length): as events will be defined in the 802.21 standard, an Event Code will be set for each of them to uniquely identify such event;
      When EDCD="0 . . . 000", an ED Descriptor (mandatory field, constant length of n bits, with n>2):
         ED Descriptor='0 . . . 00' indicates that the ED contains no additional field (this is used in queries where no more information besides the Event Code is needed),
         ED Descriptor='0 . . . 01' indicates that the ED contains one additional field, the Event Support field (used when replying to queries to just indicate whether the field is supported or not, but not providing additional information), and
         ED Descriptor='0 . . . 10' indicates that the ED contains two additional fields, the ED Length field and the Event Subcode field;
      When EDCD="0 . . . 001", an ED Descriptor (mandatory field, constant length of n bits, with n>2):
         ED Descriptor='0 . . . 00' indicates that the ED contains no additional field (this is used in publishing events when no more information besides the Event Code is needed), and
         ED Descriptor='0 . . . 01' indicates that the ED contains two additional fields, the ED Length field and the Event Subcode field;
      When EDCD="0 . . . 010", an ED Descriptor (mandatory field, constant length of n bits, with n>2):

ED Descriptor='0 . . . 00' indicates that the ED contains no additional field (this is used in registering to events when no more information besides the Event Code is needed), and
ED Descriptor='0 . . . 01' indicates that the ED contains two additional fields, the ED Length field and the Event Registration field;
ED Length (optional field, constant length): indicates the length of the remaining fields;
Event Support (optional, 1 bit, present when ED Length=0):
  Event Support=1 indicates that the event is supported, and
  Event Support=0 indicates that the event is not supported;
Event Registration (optional, variable length):
  Different formats are possible, depending on the complexity required for the dialogue, and
  A basic scenario is where the Event Registration field is only one bit, e.g., where:
    Event Support=1 indicates that registration for this event was successful, and
    Event Support=0 indicates that registration for this event was not successful;
  A more complex scenario is where the Even Registration field is a sequence of bites containing:
    Indication that registration for this event was successful (e.g. 1 bit) and additional information related to the event, e.g. regarding how the event will be reported (frequency, etc.), and
    Indication that registration for this event was not successful (e.g. 1 bit) and reason;
Event Subcode (optional): the standard may define subcodes to describe the features of the events, e.g. during queries to specify if the event defined by Event Code can be registered to and reported in a certain way; in replies to queries and in publishing events, to indicate how the event can be registered to and then reported); and
an EDC can be a collection of empty EDs (for events not supported, used when replying to a request from an MIHF) and populated EDs (for supported events, used when replying to a request from an MIHF or to publish the supported events; for registered events, used to reply to a registration request).

Information Descriptor Container

By way of example, an Information Descriptor Container (IDC) may be created as the combination of a set of Information Descriptors (ID), where:
1) Each ID contains:
  an Information Code (mandatory field, constant length): as events will be defined in the 802.21 standard, an Information Code will be set for each of them to uniquely identify such information type.
  an ID Length (mandatory field, constant length) that indicates the length of the remaining fields, e.g., where
    the ID Length=0 indicates that the ID contains only one additional field, the Information Support field, and
    the ID Length>0 indicates that the ID contains one additional field, the Event Subcode, and indicates such filed length.
  an Information Support (optional, 1 bit, present when ID Length=0), e.g., where:
    an Event Support=1 indicates that the event is supported, and
    an Event Support=0 indicates that the event is not supported.
  an Information Subcode (optional, present when ID Length>0), where the standard may define subcodes to describe the features of the events.
2) An IDC can be a collection of empty IDs (for events not supported, used when replying to a request from an MIHF) and populated IDs (for supported events, used when replying to a request from an MIHF or to publish the supported events), including:
  An optional mechanism to publish events (push model) supported by an MIHF, e.g.:
    When MIHF A needs to publish towards MIHF B the list of events supported, MIHF A sends a List-Events message to MIHF B containing an EDC populated with one ED for each event supported.
  An optional mechanism to explicitly requesting which events (pull model) are supported by a given MIHF, e.g.:
    MIHF B, upon detecting or being informed of the presence of MIHF A, can send List-Events-Request containing an empty EDC to request the whole list of events supported by MIHF A, or a populated EDC to request if one or a set of specific events are supported, and/or
    MIHF A will return a List-Events-Response message with an EDC populated with the events supported (specifically the n-th ED in the List-Events-Response message corresponds to the n-th ED in the List-Events-Request message), specifically the whole list if the EDC sent by MIHF B was empty, or and EDC containing EDs for the requested events.
  An optional mechanism to register to events and implicitly requesting which events (pull model) are supported by a given MIHF, e.g.:
    MIHF B, upon detecting or being informed of the presence of MIHF A, can send a registration message to MIHF A containing an empty EDC to request registration to the whole list of events supported by MIHF A, or a populated EDC to request registration to specific events,
    MIHF A will return a response to the registration message containing an EDC populated with the events supported, the status of the registration and optionally additional information (specifically the n-th ED in the response message corresponds to the n-th ED in the response message), specifically the whole list if the EDC sent by MIHF B was empty, or and EDC containing EDs for the requested events, and/or
    For events registration and response, the mechanism according to the present invention does not need new messages, since it is known in 802.21 that such a registration can take place, but not how.
  An optional mechanism to publish the information (push model) supported for the IS by an MIHF, e.g.:
    When MIHF A needs to publish towards MIHF B the list of information supported for the IS, MIHF A sends a List-Information message to MIHF B containing an IDC populated with one ID for each information type supported.
  An optional mechanism to request which information (pull model) are supported by a given MIHF, e.g.:

MIHF B, upon detecting or being informed of the presence of MIHF A, can send List-Information-Request containing an empty IDC to request the whole list of information supported by MIHF A, or a populated IDC to request if one or a set of specific information are supported, and/or MIHF A will return a List-Information-Response message with an IDC populated with the information supported (specifically the n-th ID in the List-Information-Response message corresponds to the n-th ID in the List-Information-Request message), specifically the whole list if the IDC sent by MIHF B was empty, or and IDC containing IDs for the requested information.

The mechanism for the pull model may be optional or mandatory, since one may think that when MIHF B requests subscription for a given event from MIHF A and receives a negative answer, MIHF B concludes that specific event is not supported (though this may be inefficient).

The way MIHF A knows how to address MIHF B is dependent on the transport used to implement 802.21. The transport of such 802.21 messages, and the way MIHF A knows how to address MIHF B are considered outside the scope of this invention. As an example of an embodiment, when using L3 transport, one can assume that MIHF A is configured (e.g. by the entity owning the terminal in which MIHF A resides, where such entity can be the end user, an enterprise or an operator) with the logical name of the MIH function (can be the same for all networks), and translates it through DNS (thus obtaining the IP address of the local one). When using the L2 transport (e.g. for an 802.11 instance of MIHF), there could e.g. be a MAC address specified for addressing the network MIHF in the standards (i.e. an address that allows routing within the DS), and the MIHF in the terminal can address the MIHF in the network using such address; if there is no MIHF in the network, an error can be returned by the AP or the terminal can decide that lack of answer indicates lack of an MIHF function.

Alternatively, the Integration Reference Point (IRP) (see the aforementioned references labelled above as [2] and [3]) can be used in an IEEE 802.21 specific way.

Figure 3:
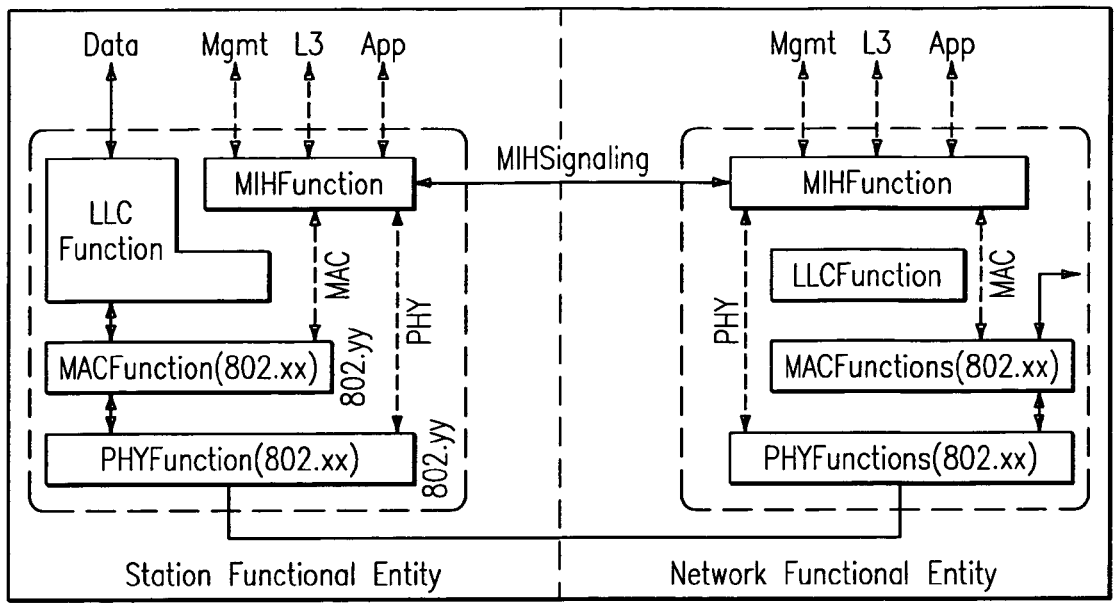
FIG. 3 is a diagram showing the functionality for a MIHF to discover the events and the type of information (for the information service) available in another MIHF to be able to subscribe to such events in relation to the IEEE 802 family.
Figure 4:
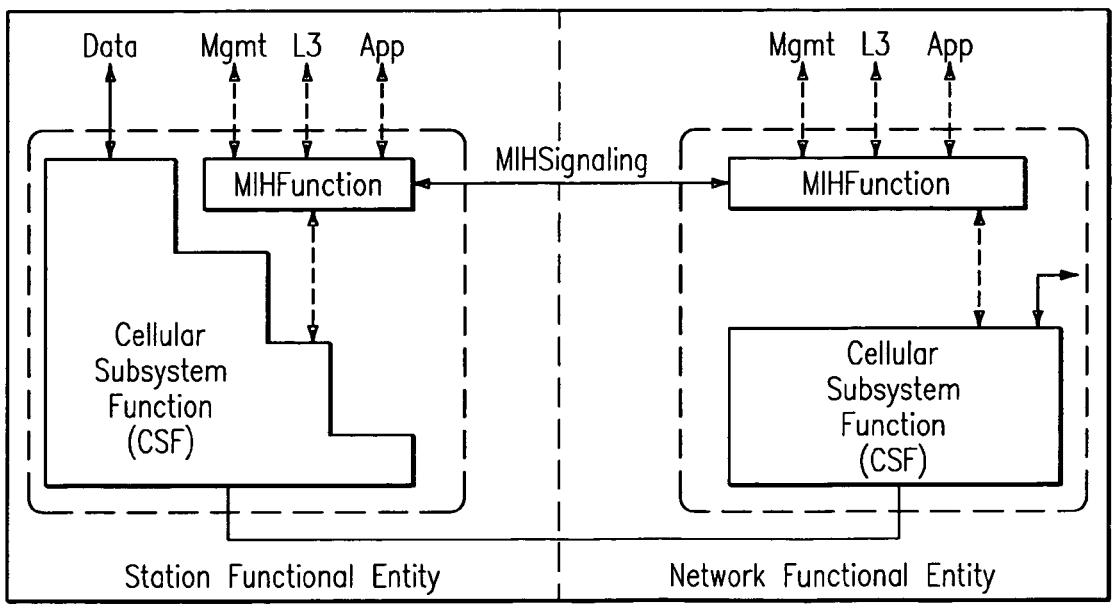
FIG. 4 is a diagram showing the functionality for a MIHF to discover the events and the type of information (for the information service) available in another MIHF to be able to subscribe to such events in relation to the IEEE 802 family of networks and non-802 cellular networks.

FIGS. 3 and 4: Discovery in the IEEE 802 Family, and the IEEE 802 and Non-802 Cellular The scope of the invention is intended to include using the mechanism or technique according to the present invention for one MIHF to discover an event or a type of information available in another MIHF in relation to any networks or systems in the IEEE 802 family either now known or later developed in the future, as well as the IEEE 802 family and the non-IEEE 802 cellular family (e.g. 3GPP and 3GPP2) either now known or later developed in the future.

FIG. 3 shows, by way of example, the functionality of the discovery in relation to the IEEE 802 family, including the station functional entity and the network functional entity. In accordance with the present invention described herein, the mechanism or technique for the MIHFunction module of the station functional entity to discover events or a type of information available in the MIHFunction module of the network functional entity, or vice versa, includes allowing the one MIHF module to request either whether a specific event, list of events, type of information or some combination thereof is being supported by the other MIHF module.

In comparison, FIG. 4 shows the functionality of the discovery in relation to the IEEE 802 family of networks and non-802 cellular networks.

The functionality of the MIHFunctionality module shown in FIG. 3 or 4 may be implemented using hardware, software, firmware, or a combination thereof, although the scope of the invention is not intended to be limited to any particular embodiment thereof. In a typical software implementation, the module would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology known or later developed in the future. Moreover, the scope of the invention is intended to include the module being included in a known MIHF module or being a stand alone module in the combination with other circuitry for implementing the same.

Advantages and Disadvantages

Advantages of the present invention include:
The invention allows efficient discovery of events supported, minimizing, and
By adding a layering of beacons/information, the impact on system capacity due to the new bits added to the beacon is kept minimal.

Target Standardizations

The invention targets standardization in 802.11. Traffic analysis to identify the message exchanges between an associating STA and the AP will reveal whether the solution is being implemented in the STA, the AP or both.

The invention also targets IEEE 802.21 and 802.11 (for the specific instantiation of the 802.21 specifications).

Abbreviations Include

MIH Media Independent Handoff
MIHF Media Independent Handoff Function
ID Information Descriptor
IDC Information Descriptor Container
ED Event Descriptor
EDC Event Descriptor Container

The Scope of the Invention

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein without departing from the spirit and scope of the present invention.

What I claim is:
1. A method comprising:
receiving signaling in one media independent handoff function module at a network node, the signaling containing information about one or more events that are supported by another media independent handoff function module at another network node, the signaling being received before subscribing to the one or more events supported by the another media independent handoff function module at the another network node; and in response to the signaling, providing corresponding signaling containing information for allowing the one media independent handoff function module to subscribe to at least one of the one or more events supported by the another media independent handoff function module.

2. A method according to claim 1, wherein the corresponding signaling contains information for the one media independent handoff function module to subscribe to a specific event or to request a list of events or type of information.

3. A method according to claim 1, wherein the one network node is a node, point, terminal or user equipment.

4. A method according to claim 1, wherein the signaling received by the one media independent handoff function module contains at least one of an event descriptor container, or an information descriptor container.

5. A method according to claim 4, wherein the event descriptor container includes a combination of an event descriptor container descriptor and a set of event descriptors.

6. A method according to claim 5, wherein the event descriptor container descriptor contains information about whether it is being used in at least one of a query related to supported events or a response to a query; a message to publish the supported events; a request/reply to subscribe to events.

7. A method according to claim 5, wherein each event descriptor contains an event code to identify each event.

8. A method according to claim 7, wherein the event descriptor includes bits that indicate whether the event descriptor contains no additional fields for use in queries where no information besides the event code is needed, or one additional field for use in queries to indicate whether the field is supported but not providing additional information, or two additional fields, including an event descriptor length field and an event subcode field.

9. A method according to claim 7, wherein the event descriptor includes bits that indicate whether the event descriptor contains no additional fields for use in publishing events when no more information besides the even code is needed, or two additional fields, including an event descriptor length field and an event subcode field.

10. A method according to claim 7, wherein the event descriptor includes bits that indicate whether the event descriptor contains no additional fields for use in registering to events when no more information besides the event code is needed, or two additional fields, including an event descriptor length field and an event subcode field.

11. A method according to claim 7, wherein the event descriptor includes an event descriptor length containing information about the length of the remaining fields.

12. A method according to claim 7, wherein the event descriptor includes event support information about whether an event is supported or not.

13. A method according to claim 7, wherein the event descriptor includes event registration information about whether registration for this event was successful or not.

14. A method according to claim 13, wherein the field for the event descriptor event registration is one bit.

15. A method according to claim 13, wherein the field for the event descriptor event registration is one or more bytes, including information regarding how the event will be reported.

16. A method according to claim 13, wherein each event descriptor contains an event subcode to describe features of events.

17. A method according to claim 4, wherein the information descriptor container includes a combination of a set of information descriptors, where each information descriptor contains an information code containing information to uniquely identify such an information type about events.

18. A method according to claim 17, wherein each information descriptor contains an information descriptor length indicating lengths of fields therein.

19. A method according to claim 4, wherein the signaling received by the one media independent handoff function module also contains information about a list-event message with the event descriptor container populated with one event descriptor for each event supported.

20. A method according to claim 4, wherein the corresponding signaling provided by the one media independent handoff function module also contains information to request which events are supported by a given media independent handoff function module including a list-event request containing an empty event descriptor container to request a whole list of events supported by the given media independent handoff function module.

21. A method according to claim 20, wherein the signalling received by the one media independent handoff function module also contains information about a list-event response message with the event descriptor container populated with the events supported by the given media independent handoff function module.

22. A method according to claim 4, wherein the corresponding signaling provided by the one media independent handoff function module also contains information to register to events and requesting which events are supported by a given media independent handoff function module by sending a registration message containing an empty event descriptor container to request registration to a whole list of events supported by the given media independent handoff function module, or a populated event descriptor container to request registration to specific events supported by the given media independent handoff function module.

23. A method according to claim 22, wherein the signaling received by the one media independent handoff function module also contains information about a response with the event descriptor container populated with the events supported by the given media independent handoff function and/or the status of the registration supported by the given media independent handoff function.

24. A method according to claim 4, wherein the signaling received by the one media independent handoff function module contains information about a list-information message containing the information descriptor container populated with one information descriptor for each information being supported.

25. A method according to claim 4, wherein the corresponding signaling provided by the one media independent handoff function module also contains information to request which information is supported by a given media independent handoff function module, including a list-information-request containing an empty information descriptor container to request a whole list of information supported by the given media independent handoff function, or a populated information descriptor container to request if one information or a set of information is supported.

26. A method according to claim 25, wherein the signaling received by the one media independent handoff function module also contains information about a list-informationresponse message with the populated information descriptor container having the information supported by the given media independent handoff function module.

27. A method according to claim 1, wherein the method is performed in a computer program running on a processor or other suitable processing device in a network node in a network or system.

28. A network node comprising:
   at least one processor; and
   at least one memory including computer program code, wherein the at least one memory and the computer program code are configured, with the at least one processor, to cause the network node to:
   receive signaling containing information about one or more events that are supported by a media independent handoff function module at another network node, the signaling being received before subscribing to the one or more events supported by the media independent handoff function module at the another network node; and
   in response to the signaling, provide corresponding signaling containing information to subscribe to at least one of the one or more events supported by the media independent handoff function module.

29. A network node according to claim 28, wherein the corresponding signaling contains information to subscribe to a specific event or to request a list of events or type of information.

30. A network node according to claim 28, wherein the network node is a node, point, terminal or user equipment.

31. A network node according to claim 28, wherein the signaling received by the network node contains at least one of the following: an event descriptor container, or an information descriptor container.

32. A network node according to claim 28, wherein the network node is an access point.

33. A network node according to claim 28, wherein the network node is a station.

34. A non-transitory computer-readable storage medium having computer-executable components for performing a method comprising:
   receiving signaling in one media independent handoff function module at a network node, the signaling containing information about one or more events that are supported by another media independent handoff function module at another network node, the signaling being received before subscribing to the one or more events supported by the another media independent handoff function module at the another network node; and
   in response to the signaling, providing corresponding signaling containing information for the one media independent handoff function to subscribe to at least one of the one or more events supported by the another media independent handoff function module.

35. Apparatus comprising:
   means for receiving signaling in one media independent handoff function module at a network node, the signaling containing information about one or more events that are supported by another media independent handoff function module at another network node, the signaling being received before subscribing to the one or more events supported by the another media independent handoff function module at the another network node; and
   means for providing, in response to the signaling, corresponding signaling containing information for the one media independent handoff function to subscribe to at least one of the one or more events supported by the another media independent handoff function module wherein the means for receiving signaling and the means for providing comprise at least one hardware processor.

* * * * *